United States Patent
Walsh et al.

(10) Patent No.: US 6,865,388 B2
(45) Date of Patent: Mar. 8, 2005

(54) DYNAMIC QUEUE DEPTH MANAGEMENT IN A SATELLITE TERMINAL FOR BANDWIDTH ALLOCATIONS IN A BROADBAND SATELLITE COMMUNICATIONS SYSTEM

(75) Inventors: William Walsh, Anaheim Hills, CA (US); Craig Schweinhart, Rockville, MD (US)

(73) Assignee: Hughes Electronics Corporation, El Segundo, CA (US)

( * ) Notice: Subject to any disclaimer, the term of this patent is extended or adjusted under 35 U.S.C. 154(b) by 530 days.

(21) Appl. No.: 09/925,180

(22) Filed: Aug. 9, 2001

(65) Prior Publication Data

US 2003/0032427 A1 Feb. 13, 2003

(51) Int. Cl.[7] ............................................... H04B 7/185
(52) U.S. Cl. ...................... 455/428; 455/12.1; 455/423; 370/348; 370/316
(58) Field of Search .................................. 455/427, 428, 455/430, 434, 450–453, 9, 11.1, 12.1, 13.1, 13.2, 502, 509, 511, 515, 516, 67.11, 423, 3.01–3.02, 3.05–3.06; 370/412, 468, 429, 316, 321, 349, 348; 710/52; 711/170; 244/3.14

(56) References Cited

U.S. PATENT DOCUMENTS

| | | | | |
|---|---|---|---|---|
| 5,521,923 A | * | 5/1996 | Willmann et al. | 370/412 |
| 5,724,358 A | * | 3/1998 | Headrick et al. | 370/418 |
| 5,757,784 A | * | 5/1998 | Liebowitz et al. | 370/321 |
| 6,400,685 B1 | * | 6/2002 | Park | 370/232 |
| 6,442,146 B1 | * | 8/2002 | Onodera et al. | 370/321 |
| 6,442,661 B1 | * | 8/2002 | Dreszer | 711/170 |
| 6,452,950 B1 | * | 9/2002 | Ohlsson et al. | 370/516 |
| 6,684,273 B2 | * | 1/2004 | Boulandet et al. | 710/52 |
| 6,731,613 B1 | * | 5/2004 | Provance | 455/3.02 |
| 2001/0007565 A1 | * | 7/2001 | Weng et al. | 370/429 |
| 2002/0003776 A1 | * | 1/2002 | Gokhale et al. | 370/236 |
| 2002/0104920 A1 | * | 8/2002 | Thompson et al. | 244/3.14 |
| 2002/0114313 A1 | * | 8/2002 | Walsh et al. | 370/348 |
| 2003/0031141 A1 | * | 2/2003 | Schweinhart et al. | 370/316 |
| 2003/0032391 A1 | * | 2/2003 | Schweinhart et al. | 455/12.1 |
| 2003/0035385 A1 | * | 2/2003 | Walsh et al. | 370/316 |

FOREIGN PATENT DOCUMENTS

WO    WO 03/096553    * 11/2003

* cited by examiner

*Primary Examiner*—David Hudspeth
*Assistant Examiner*—Kamran Afshar
(74) *Attorney, Agent, or Firm*—John T. Whelan

(57) ABSTRACT

An approach for managing queues of a terminal operating in satellite communications system is disclosed. A hub controls bandwidth allocations in conjunction with a satellite. A plurality of terminals is configured to issue bandwidth allocation requests to the satellite. Each of the terminals has queues that are configured to store the packets, and a queue control logic that is configured to dynamically change depths of the queues according to a prescribed scheme. The prescribed scheme specifies new depths of the plurality of queues based upon past bandwidth allocations associated with the respective queues.

49 Claims, 10 Drawing Sheets

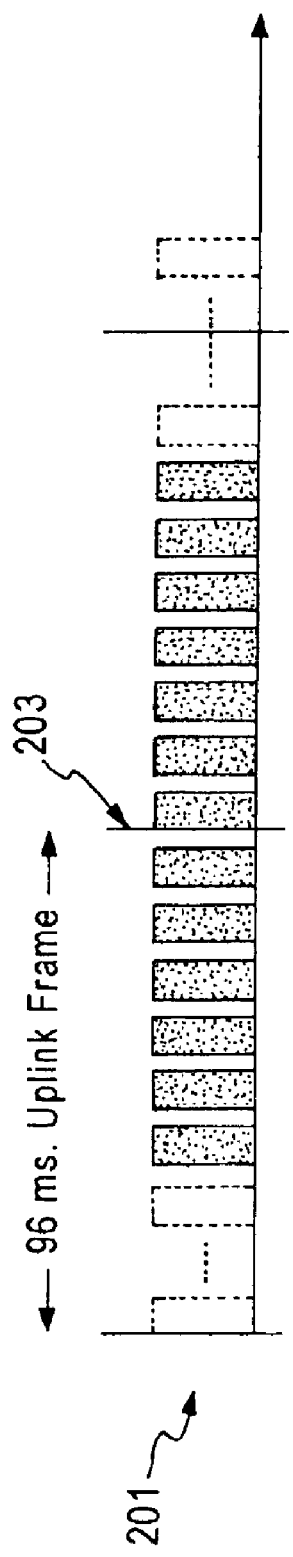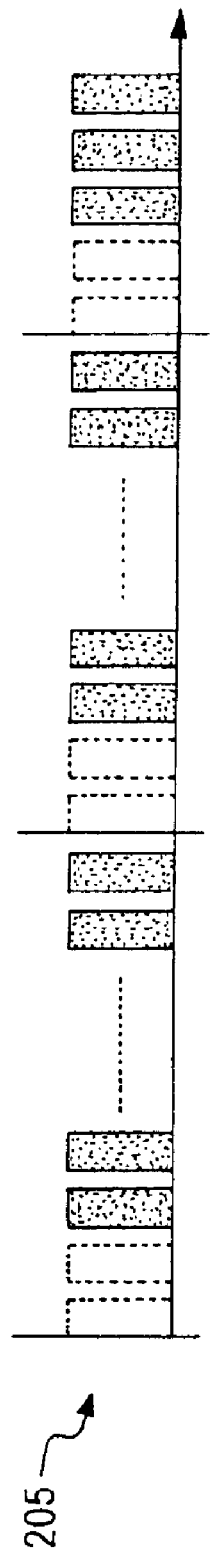
FIG. 2A
FIG. 2B

FIG. 5

Uplink Packet Thread: Example Queues/BOD Requests

| | Packets on Queue | PDS Mapping 515 | Priority/Rate 519 | Profile Limit 521 | Volume BOD Request 523 |
|---|---|---|---|---|---|
| I1 Internal ST BOD Queue 501 ← BOD Requests | 0 | Use Excess Volume/Rate, Preempt Volume/Rate Use Contention | N/A | N/A | N/A |
| I2 Internal ST Mgmt. Queue 503 ← Usage Data | 15 | Use Excess Volume/Rate, Use Volume | Weight 10 | Internal Profile 5 | 5 |
| C1 Constant Rate Queue 505 ← Port 1 Video Teleconference | 0 | Use Rate | Constant Rate: 2 Pkts/Frame | N/A | N/A |
| C2 Vol Threshold = 4 Constant Rate with Burst Queue 507 ← Port 2 Custom Application | 8 | Use Rate, If Over Threshold, Use Volume | Prioritized Order 2 Constant Rate: 2 Pkts/Frame | Volume Profile 106 | 6 |
| L1 Threshold = 6 Low-volume Low-latency Burst Queue 509 ← Port 1/2 TCP Sync, HTTP Get | 2 | Use Excess Volume/Rate, Preempt Volume, Use Contention | Prioritized Order 1 | N/A | N/A |
| B1 Normal Burst Queue 511 ← Port 1 Data | 50 | Use Volume | Weight 45 | Volume Profile 106 | 50 |
| B2 Normal Burst Queue 513 ← Port 2 Data | 100 | Use Volume | Weight 45 | Volume Profile 106 | 50 |

DYNAMIC QUEUE DEPTH MANAGEMENT IN A SATELLITE TERMINAL FOR BANDWIDTH ALLOCATIONS IN A BROADBAND SATELLITE COMMUNICATIONS SYSTEM

BACKGROUND OF THE INVENTION

1. Field of the Invention

The present invention relates generally to a broadband communication system, and is more particularly related to managing queues within a terminal.

2. Discussion of the Background

As society, in general, become increasingly reliant on communication networks to conduct a variety of activities, ranging from business transactions to personal entertainment, communication engineers continually face the challenges of optimizing use of network capacity and ensuring network availability to a diverse set of users with varying traffic requirements. Because capacity requirements of different users, for that matter of the same users, can fluctuate depending on time day and applications, the accuracy of traffic forecasts is diminished. Inaccurate forecasts can lead to negative effects, such as traffic congestion, slow response times, or even loss data. The maturity of electronic commerce and acceptance of the Internet as a daily tool by millions of users (this user base continues to grow) only intensify the need to develop techniques to streamline capacity usage. With the advances in processing power of desktop computers, the average user has grown accustomed to sophisticated multimedia applications, which place tremendous strain on network resources (e.g., switch capacity). Also, because the decrease in application response times is a direct result of the increased processor performance, the user has grown less tolerant of network delays, demanding comparable improvements in the network infrastructure. Therefore, efficient use of network capacity is imperative, particularly in systems where capacity needs to be managed carefully, such as a satellite network.

Satellite communications systems have emerged as an accessible and reliable network infrastructure that can support the exchange of voice, video, and data traffic. Conventionally, these satellite communications systems offer dedicated communication channels that relay or tunnel traffic without processing such traffic (i.e., "bent pipe"). That is, the system has no knowledge of what types of protocols are used or data that is contained within the packets. One drawback with these satellite communications systems is that they are highly inefficient with respect to bandwidth allocation. For example, if the satellite has excess transponder bandwidth at a particular time, this excess capacity cannot be temporarily reallocated to another satellite terminal (ST). Another drawback is that the satellite cannot perform any processing on the received traffic; thus, key networking functions, such as flow control and congestion control, are not available. Yet another drawback concerns the inflexibility of the system to adapt dynamically to the traffic requirements of the STs. Given the bursty nature of Internet traffic, traffic emanating from the STs can vary greatly, thereby making it technically impractical to adjust the static channel assignments of the traditional bent pipe satellite systems.

Further, the STs, as an entry point into the satellite network, need to buffer large amounts of traffic. This buffering is conventionally accomplished using static queues. Given the diversity of traffic type, coupled with data flows of varying priorities, the use of static queues can result in wasted memory as well as unnecessary dropping of packets.

Based on the foregoing, there is a clear need for improved approaches for managing queues within the terminals of a satellite communications system.

There is also a need to enhance efficient utilization of the system capacity.

There is a further need to dynamically adapt to bandwidth requirements of the satellite terminals.

Based on the need to improve system efficiency, an approach for managing queues within the terminal to adapt to the dynamic nature of a bandwidth-on-demand system is highly desirable.

SUMMARY OF THE INVENTION

According to one aspect of the invention, a method is provided for managing a plurality of queues of a terminal operating in satellite communications system. The method includes storing packets in the plurality of queues. In addition, the method includes dynamically changing a depth of one of the plurality of queues according to a prescribed scheme. The prescribed scheme specifies a new depth of the one queue based upon past bandwidth allocations associated with the one queue. Under this approach, the queuing efficiency is enhanced.

According to another aspect of the invention, a terminal apparatus for transmitting packets to a satellite communications system comprises a plurality of queues configured to store the packets. A queue control logic is configured to dynamically change depths of the plurality of queues according to a prescribed scheme, wherein the prescribed scheme specifies new depths of the plurality of queues based upon past bandwidth allocations associated with the respective plurality of queues. This arrangement advantageously provides improvement in honoring quality of service levels.

According to another aspect of the invention, a satellite communications system comprises a hub configured to control bandwidth allocations in conjunction with a satellite. A plurality of terminals is configured to issue bandwidth allocation requests to the satellite. Each of the terminals comprises a plurality of queues that are configured to store the packets, and a queue control logic that is configured to dynamically change depths of the plurality of queues according to a prescribed scheme. The prescribed scheme specifies new depths of the plurality of queues based upon past bandwidth allocations associated with the respective plurality of queues. The above arrangement advantageously adapts dynamically to queuing requirements, thereby reducing memory size requirements.

In another aspect of the invention, a terminal apparatus for transmitting packets to a satellite communications system comprises means for storing packets in the plurality of queues. The terminal apparatus also includes means for dynamically changing a depth of one of the plurality of queues according to a prescribed scheme. The prescribed scheme specifies a new depth of the one queue based upon past bandwidth allocations associated with the one queue. The above arrangement advantageously reduces memory size.

In yet another aspect of the invention, a computer-readable medium carrying one or more sequences of one or more instructions for managing a plurality of queues of a terminal operating in satellite communications system is disclosed. The one or more sequences of one or more instructions include instructions which, when executed by one or more processors, cause the one or more processors to perform the step of storing packets in the plurality of queues. Another step includes dynamically changing a depth of one of the plurality of queues according to a prescribed scheme, the prescribed scheme specifying a new depth of the one queue based upon past bandwidth allocations associated with the one queue. This approach advantageously improves servicing of user traffic.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 2A and 2B are diagrams of the bandwidth allocation operation, according to an embodiment of the present invention;

FIG. 5 is a diagram of exemplary queues whose depths are dynamically altered, according to an embodiment of the present invention;

DESCRIPTION OF THE PREFERRED EMBODIMENTS

In the following description, for the purpose of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

The present invention accomplishes dynamic management of queues within a satellite terminal. The satellite terminal includes a queue control logic that is configured to dynamically change depths of the plurality of queues according to a prescribed scheme. The prescribed scheme specifies new depths of the plurality of queues based upon past bandwidth allocations associated with the respective plurality of queues.

Although the present invention is described with respect to a satellite communications system that supports packet switching, it is recognized by one of ordinary skill in the art that the present invention has applicability to packet switching systems, in general.

Figure 1:
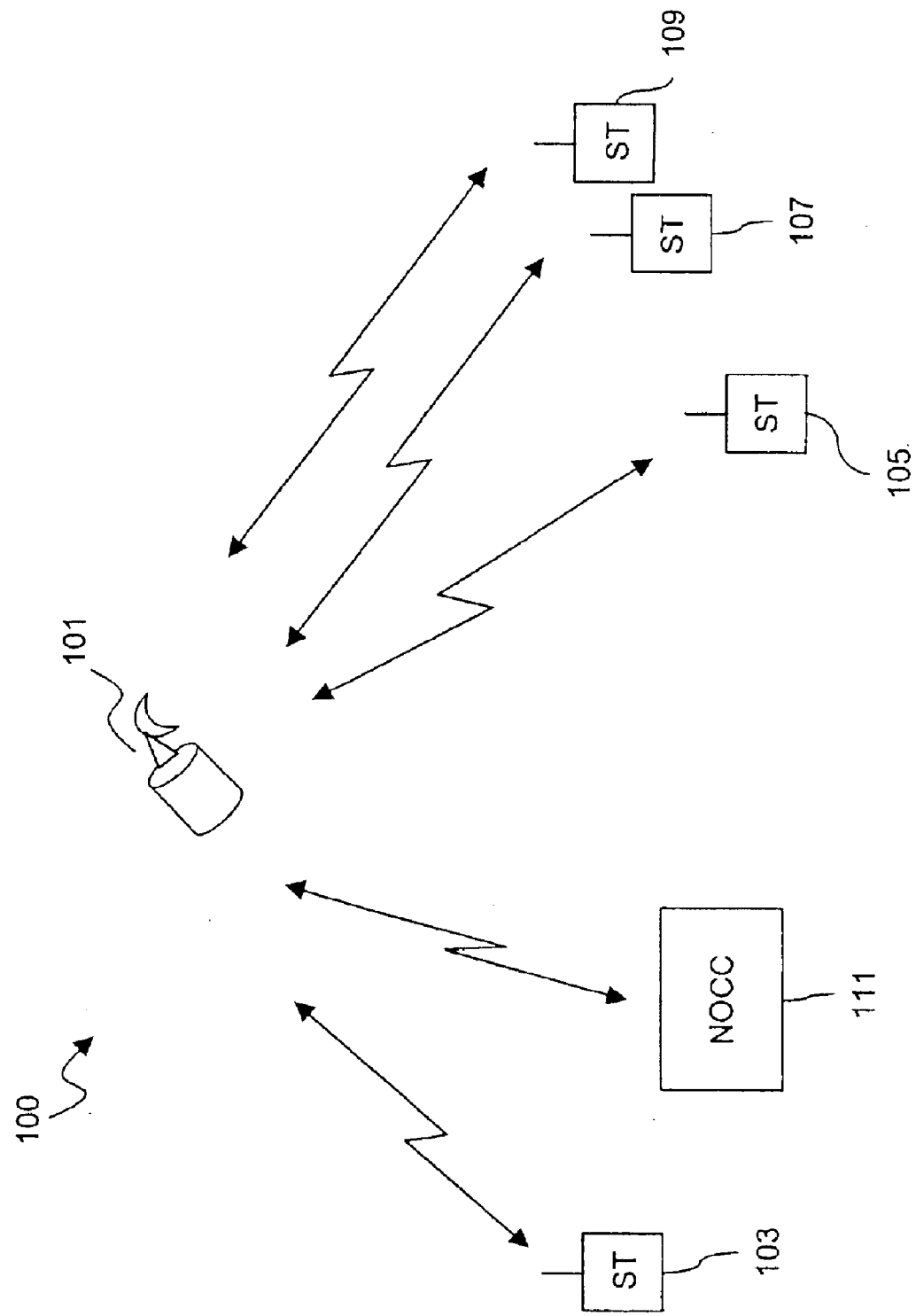
FIG. 1 is a block diagram of a satellite communications system that includes satellite terminals supporting dynamic queue management, in accordance with an embodiment of the present invention.

FIG. 1 show a block diagram of a satellite communications system capable of supporting contention channels, in accordance with an embodiment of the present invention. A communication system 100 includes a satellite 101 that supports communication among satellite terminals (STs) 103, 105, 107, and 109. System 100 employs Network Operations Control Center (NOCC) 109 to manage and control communication services and operations. For example, the NOCC 109 provisions and identifies the channels that are to be used for the various packet delivery services, which are supported by the system 100. These packet delivery services are more fully described below.

In an exemplary embodiment, the STs 103, 105, 107, and 109 are Very Small Aperture (VSAT) terminals. Under this architecture, users can communicate from one VSAT ST to another directly with one satellite hop. That is, the system 100 provides mesh connectivity. According to one embodiment of the present invention, system 100 possesses a centralized reservation mechanism for providing bandwidth on demand (BoD). Because BoD request rate may be limited, the present invention act to offload the centralized reservation mechanism by handling low data rate flows.

Unlike conventional bent-pipe satellite systems, satellite 101 demodulates fixed-length packets that are received from STs on uplink spot beams, queues the packets for the proper downlink destination based on packet header information, and then modulates the packets for transmission on the specified downlink spot beam. Satellite 101 employs spot beams and possesses processing functions that permit greater power and spectral efficiency than traditional bent-pipe satellites. Further, satellite 101 can replicate individual packets that are received on the uplink and send these packets to multiple downlink spot beam destinations. In this manner, satellite 101 can retain broad distribution capabilities of the bent-pipe satellite systems, while providing flexibility in terms of bandwidth allocations.

Satellite 101 contains a fast packet switch (FPS) (not shown) to process data packets that are exchanged across system 100. Exemplary switches include an ATM (Asynchronous Transfer Mode) switch, and a Gigabit Ethernet switch; it is recognized by one of ordinary skill in the art that any type of switch can be utilized. The FPS transfers the packets that the payload of the satellite 101 receives on the uplinks to the proper downlinks. The payloads of satellite 101 may include other components, such as uplink antenna, down-converters, switch matrix, demodulator banks, and phased-array downlink antenna; these other components are well known, and thus, are not described in detail.

The satellite 101 performs the necessary bandwidth control functions, in conjunction with the Network Operations Control Center (NOCC) 111 (i.e., a hub). In system 100, STs 103, 105, 107, and 109 originate traffic from a particular coverage area and may transmit connectionless traffic as well as connection-oriented traffic. The generated traffic from these STs 103, 105, 107, and 109 are transferred through switch and terminate at destination STs (not shown) within the same and/or different coverage area. That is, the destination STs can be within the same coverage area as the originating STs. To effectively transmit traffic to the desired destination ST through the switch of the satellite 101, STs 103, 105, 107, and 109 transmit bandwidth requests to the satellite 101 prior to transmitting any data traffic.

A connection that is established between a source ST and a destination ST is controlled by the satellite 101 and the NOCC 111. The NOCC 111, which is based on the ground, provides management functions for the system 100. For example, an ST needs to obtain authorization from the NOCC 111 before making a request to the satellite 101. The NOCC 111 keeps track of the total uplink (and downlink) bandwidth available for connections and will block a connection request if there is insufficient satellite capacity available to satisfy the request.

The satellite 101 implements the bandwidth control function, which includes controlling the allocation of uplink channels and timeslots and mitigating downlink congestion. Satellite 101 examines the requested bandwidth and replies with grants based on downlink resource availability, as determined by a congestion avoidance logic (not shown) and uplink resource availability. The congestion avoidance logic regulates the amount of traffic received by the switch through, for example, TDMA (Time Division Multiple Access)/FDMA (Frequency Division Multiple Access) uplink channels via request/grant bandwidth control processes.

According to one embodiment of the present invention, two types of requests are defined: rate requests, and volume requests. As will be detailed later, these requests are delivery services in support of transport services. In general, rate requests are utilized for connection-oriented traffic, while volume requests are used to transmit bursty traffic. The present invention has particular application to volume requests. STs 103, 105, 107, and 109, in general, can submit rate requests as well as volume requests, depending on the mode of operation (i.e., the type of traffic the ST is processing). Rate requests specify the number of slots in each uplink frame that an ST (e.g. 103) needs to meet the uplink demands for a relatively constant traffic (e.g., connection-oriented). A rate request results in the allocation of a constant number of slots each frame, spread out as evenly in time as possible, which the ST (e.g. 103) can use to send packets at a constant rate. The requesting ST (e.g. 103) gets a constant allocation of that uplink capacity every frame until the request is cancelled by the ST (e.g. 103) via a de-allocation message to the satellite.

Volume requests specify the number of uplink slots that an ST (e.g. 103) requires to send a specific number of packets to another ST (e.g. 103). The requesting ST (e.g. 103) receives a periodic allocation of one or many slots within a specific frame until the entire number of slots requested has been allocated. Volume requests are used by the ST (e.g. 103) to send a burst (one or many) of data packets on the uplink. Several volume requests may be transmitted by the ST (e.g. 103) in a short period of time to send a file that has hundreds of data packets (e.g., segmented IP (Internet Protocol) packets) to another ST (e.g. 105, 107, and 109).

The bandwidth request operation is performed by an ST (e.g. 103) that transmits data using a rate request during one session and a volume request during another session. A satellite terminal transmits a bandwidth request message to the satellite over a contention channel. Based on the current traffic load, the satellite 101 may dynamically assign some of the uplink channels on a frame-by-frame basis to change the designation of these uplink channels from data channels to contention channels. Thus, when the traffic on the data channels is light, the satellite 101 can assign most of the data channels to be used as contention channels, thereby reducing the collision rate for contention accesses by the STs. In other words, as traffic on data channels increases, the satellite 101 can change contention channels into data channels, as appropriate. This advantageously permits a more efficient use of satellite capacity, in that as the load increases, fewer channels are dedicated to receiving new bandwidth request messages.

Upon receiving the bandwidth request message and after determining that bandwidth is available, the satellite 101 sends a rate allocation every frame to provide the ST (e.g. 103) with a fixed number of time slots that the ST (e.g. 103) can transmit into that frame. Specifically, the satellite 101 allocates uplink slots in response to bandwidth requests from STs in each uplink beam once every frame and sends rate allocations to the STs in these downlink cells once per frame using allocation messages. Sending rate allocations every frame allows the satellite 101 to move rate allocation slots within a channel or to another channel to "defragment" the rate allocations.

According to one embodiment, the satellite 101 packs allocations for several STs into each allocation message to preserve downlink bandwidth. The satellite 101 addresses allocation messages to a dedicated multicast group address so that these packets can be processed by all of the STs in the uplink cell that are waiting for slot allocations. These STs process every allocation message that they receive to find the ones that contain their own destination addresses and their corresponding allocations.

Rate requests, according to an embodiment of the present invention, are acknowledged by the satellite 101 in one of two ways, rate allocation within an allocation message or rate denied within an acknowledgement message. As used herein, the term assignment messages refer to both allocation messages and acknowledgement messages; an acknowledgement message effectively is a denial of the request (i.e., no slots have been allocated). If an ST (e.g. 103) receives a request denied response to a rate request, the ST (e.g. 103) notifies the NOCC 111, which then determines the course of action. Rate requests are de-allocated (released) by the ST (e.g. 103) when the ST (e.g. 103) has completed its transmission. Rate de-allocated messages from the ST (e.g. 103) are not acknowledged by the satellite 101. The ST (e.g. 103) monitors the multicast allocation message from the satellite 101 to determine that the rate was de-allocated. The NOCC 111 can also de-allocate a rate request for an ST (e.g. 103).

The size of rate requests can be increased or decreased by sending a rate change request specifying a different number of slots per frame. The change request is sent using an allocation from the original rate request. If the rate change is granted, the ST (e.g. 103) receives an allocation for the new rate within a multicast allocation message. If the rate change is denied, the ST (e.g. 103) receives a multicast acknowledgement message indicating the denial. The satellite 101 does not de-allocate the original rate request until the satellite 101 has successfully processed and allocated the changed rate request.

An ST (e.g. 103) that does not receive a multicast packet with its allocation (due to a rain fade, etc.) cannot transmit. The ST (e.g. 103) must wait until a multicast is received that specifies the allocation to resume transmission.

Successive rate allocations provide the ST (e.g. 103) with the same number of time slots in a frame; however, the channel and slot locations for that allocation may be changed. Upon receiving the rate allocation, the ST (e.g. 103) can begin transmitting data. Thus, an ST (e.g. 103) may send a packet burst into a timeslot on a data channel only if the ST (e.g. 103) has sent a request message to the satellite 101 and has received an allocation from the satellite 101 authorizing the ST (e.g. 103) use of specific timeslots on a particular channel. It should be noted that the data channels experience no collisions because the satellite 101 only allocates a timeslot on a data channels to a single ST (e.g. 103). The rate allocation remains until the ST (e.g. 103)

sends a bandwidth release packet. Initial bandwidth requests for a rate allocation are typically sent on a contention channel. However, the release packet, which de-allocates a rate, can be sent within the rate allocation that is being de-allocated.

FIGS. 2A and 2B show examples of volume allocations from the satellite 101 in the system 100. A volume allocation gives an ST (e.g., 103, 105, 107, and 109) permission to transmit into specified timeslots on a specified channel. STs request volume allocations when they have a specific number of data packets that the STs seek to deliver. Diagram 201 shows that the ST has been allocated 13 bursts in contiguous timeslots on a specified channel. The allocations straddle an uplink frame boundary 203.

With respect to diagram 205 of FIG. 2B, the ST has been allocated timeslots in three consecutive frames. There is a rate allocation (shown in white) to another ST on this channel, so the volume allocation (shown in black) is interspersed with the rate allocation over multiple frames.

Figure 3:
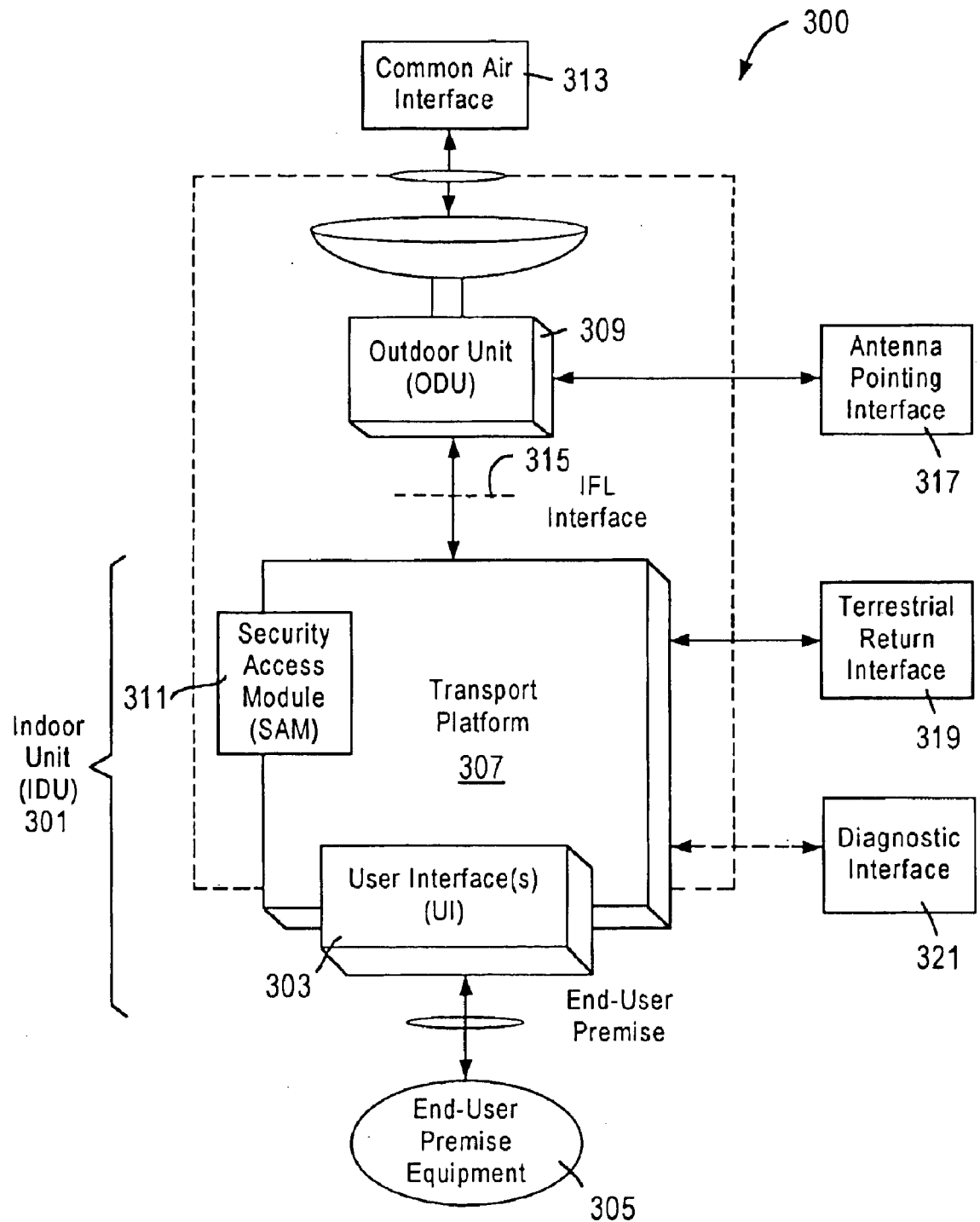
FIG. 3 is a block diagram of a Satellite Terminal (ST) utilized in the system of FIG. 1.

FIG. 3 shows a block diagram of a Satellite Terminal (ST) utilized in the system of FIG. 1. ST 300 has a layered functional architecture, which includes two functional elements: a core Transport Platform (TP) 301 and one or more application specific User Interfaces (UI) 303. The TP 307 is the functional element that provides the basic communications services including the physical, network and management layers. The TP 307 is generic in the sense that diverse end user applications can be accommodated without change to the TP 307. The UI 301 is the functional element that provides the interface between the TP 307 and an end user equipment 305. The UI 301 provides any adaptation necessary such that the end user applications can be communicated over system 100.

The ST 300 includes the following components: an Indoor Unit (IDU) 301, an Outdoor Unit (ODU) 309, a Security Access Module (SAM) 311, and User Interface (UI) 303. The IDU 301 unit is installed indoors and typically includes such components (not shown) as an uplink modulator, downlink demodulator, data packet handler, terminal control subsystem, power supply and chassis. The ODU 309, which is installed outdoors, includes a small antenna, antenna feed, RF transmitter, high power amplifier (HPA), and IF (Intermediate Frequency) conversion functions.

The SAM unit 311 provides security functions, including authentication, network access control, key management and network signaling encryption. In an exemplary embodiment, the SAM 311 is a replaceable module that is installed as part of the IDU 301.

The UI unit 303 provides the user interface and adaptation function that allows users to connect the End-User premise equipment 305 to the system 100. The UI 303 may be implemented as a plug in module or be built into the IDU 301, depending on the ST type.

Further, ST 300 has a number of interfaces: a Common Air Interface (CAI) 313, an Inter-Facility Link (IFL) 315, an Antenna Pointing Interface 317, a Terrestrial Return Interface 319, a Diagnostic Interface 321, and UI 303. ST 300 complies with the common air interface 313, which includes all aspects of the physical, link, network and management layers that defines the interface between the ST 300 and the system 100. The inter facility link (IFL) 315 is an internal interface that connects the IDU 301 and ODU 309. The IFL 315, according to an exemplary embodiment, consists of standard coaxial cables.

The user interface 303 defines the nature of a specific application process and the manner by which the application is adapted to system 100. According to an embodiment of the present invention, the UI 303 is an Ethernet interface (e.g., 10BaseT, 100BaseT, etc.). It is recognized by one of ordinary skill in the art that any number of user interfaces may be utilized.

The antenna pointing interface 317 permits the end-user to steer the antenna towards satellite 101 to obtain proper signal strength. That is, the ST 300 provides an indicator that is accessible at the ODU 309 for use in pointing the antenna to the proper satellite 101. The pointing indicator provides feedback that reflects the relative received signal quality; the antenna position is adjusted until the peak signal quality is achieved.

Via the Terrestrial Return Interface 319, ST 300 supports a terrestrial return capability for terminals that do not have satellite transmission capability. This interface 319 may use, for example, an internal dial-up modem that supports data rates up to 56 kbps, along with the necessary interface logic to connect to a public switched telephone network (PSTN).

Diagnostic interface 321 is used for field service application; such as, testing by the field technician. The end-user does not have access to this interface 321, which is protected against unauthorized usage. This interface 321 may be an asynchronous serial port that supports data rates up to 19.2 kbps.

Several ST types exist, and are categorized based upon the particular application. End-User Satellite Terminals (ESTs) are complete terminals with all the necessary interworking functions to interface with End-User Premises Equipment 305 (e.g., an individual personal computer or a business local area network (LAN)). STs may also be Network Satellite Terminals (NSTs), which are complete terminals with all the necessary interworking functions to interface with the network infrastructure of, for instance, an enterprise customer (e.g. network access nodes for Internet backbone), as discussed in FIG. 1. NSTs are well suited to large businesses, corporate headquarters, and Internet Services Provider (ISP) applications. The NOCC 111 also uses STs for internal network operations and management; such STs are termed System Satellite Terminals (SSTs). As used herein, the term "ST" refers to any one of the above ST types.

In an exemplary embodiment, as discussed earlier, ST 300 supports the "A" frequency band from 29.5 to 30 GHz for the uplink. The uplink frequency band has an aggregate spectrum of 500 MHz contained within the uplink Ka-band. ST 300 uses Frequency Division Multiplexed (FDM) uplink carriers that represent the smallest assignable portion of continuous spectrum within the uplink frequency band. According to one embodiment of the present invention, a number of FDM carrier burst rates are supported (e.g., 128 kbps, 512 kbps, 2 Mbps and 16 Mbps) depending on the ST type.

ST 300 uses Time Division Multiple Access (TDMA) on each uplink FDM carrier. This access technique allows multiple STs to share an uplink FDM carrier. The unit of transmission on the uplink is a TDMA burst. Each TDMA burst includes a start guard time, a unique word, a traffic segment and an end guard time. The traffic segment contains uplink code blocks, which are made up of two one hundred and eight byte packets and a four byte Access Control Field. ST 300 provides Forward Error Correction (FEC) encoding for the uplink code blocks.

As indicated previously, ST 300 supports two types of packet delivery services: connection-oriented packet delivery service (i.e., rate), and connectionless packet delivery service (i.e., volume). ST 300 sends packets to one or more STs at a fixed rate. ST 300 supports both scheduled and on-demand connections in response to user interface signaling. The scheduled connections are based on configuration from the NOCC 111 that provides information such as when the connection is to be established, the duration of the connection, the needed bandwidth, priority, etc. The connection setup requires first the NOCC 111 admission control and then the payload bandwidth allocation before packets can be sent.

For connectionless service, ST 300 sends a burst of packets to one or more STs. The ST requests from the satellite 101 the number of packets that it wants to send (volume request). The connectionless setup requires only the bandwidth allocation by the satellite 101 before packets can be sent (i.e., no NOCC admission control).

Figure 4:
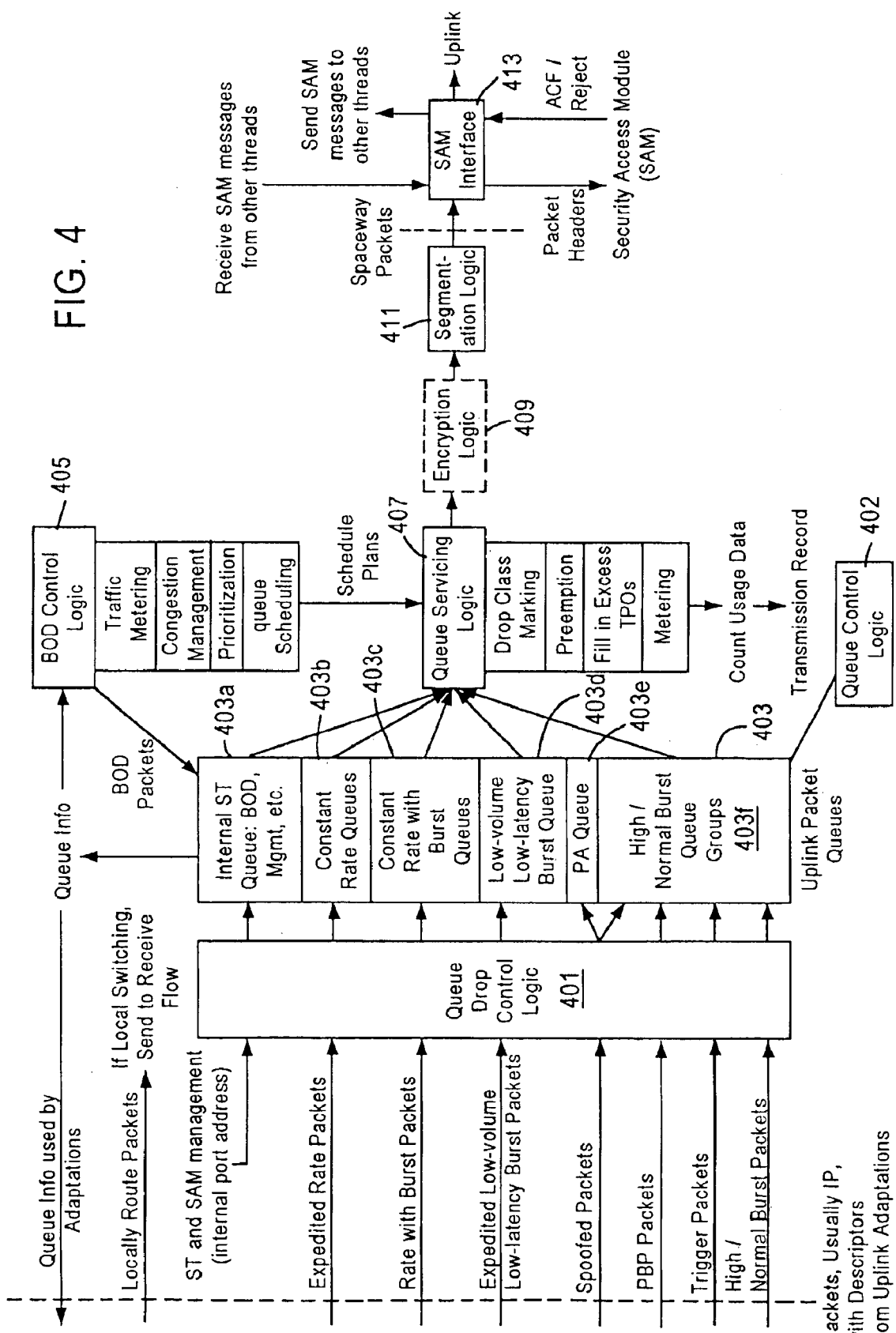
FIG. 4 is a diagram of the transport platform of the ST of FIG. 3, associated with the uplink packet thread.

FIG. 4 shows a diagram of the transport platform of the ST of FIG. 3, associated with the uplink packet thread. TP 307 of ST 300 forwards packets to satellite 101 using an uplink packet thread. This thread is performed by a queue drop control logic 401, which filters out packets based on various policies and transmits other packets to a set of uplink packet queues 403. The management of these queues 403 is controlled by queue control logic 402 and more fully described with respect to FIGS. 5 and 6.

A Bandwidth-on-Demand (BoD) control logic 405 performs traffic metering, congestion management, prioritization, and queue scheduling to send BoD packets to the queues 403. The BoD control logic 405 also outputs schedule plans to a queue servicing logic 407. The scheduling operation is further described in FIGS. 7, 8A and 8B. Queue servicing logic 407 executes the following functions: drop class marking, preemption, fill-in, and metering. The output of the servicing logic 407 may be encrypted via an encryption logic 409, which in turn, provides encrypted packets to a segmentation logic 411. The segmentation logic 411 may segment the encrypted packets into packets of a prescribed format. These formatted packets are then supplied to a SAM interface 413.

In providing user data transport services, ST 300 manages the set of queues 403 such that at any point in time, each service is mapped to a single queue or a group of queues 403; these queues 403 may be logical in form of a linked-list structure. According to one embodiment of the present invention, the queues 403 include the following queues: an Internal ST queue 403a for storing BoD packets, control packets, and management packets; a Constant Rate (CR) queue 403b; a Constant Rate with Burst (CRWB) queue 403c; a Low-volume Low-latency Burst queue 403d; Persistent Aloha (PA) queue 403e, and a Normal Burst queue 403f. For High Priority/Normal Priority Burst (HP/NPB) services and Low-volume Low-latency Burst (LVLLB) service, the mapping is based upon configuration by the NOCC 111. For Constant Rate and Constant Rate with Burst services, the mapping is based upon the Connection Management requesting instances of these services for each connection.

For the volume-based User Data Transport Services, the system design requires the ST to give separate treatment to packets destined to each downlink region (containing one or more destination downlink microcells), primarily to support the congestion control mechanisms and to control traffic to premium, highly utilized destinations. Whenever a volume-based service sends packets to multiple downlink regions, the service is mapped to a group of queues. Each queue holds packets destined to a set of one or more downlink microcells in the downlink region.

The set of one or more queues used to support a User Data Transport Service is termed a "Service Queue Group." All of the queues in a queue group use the same configuration and control parameters of the service, differing only by destination.

The Address Resolution and Classification functions map packets to a user service instance (identifying the Service Queue Group), destination downlink region, and connection number, which are used to select a specific queue. For the CR and CRWB services, the connection number is used to map to a specific queue 403 within the service instance. For the Normal/High Priority Burst (N/HPB) services, the downlink region is used to map to a specific queue 403 within the service instance.

To meet the system requirements, ST 300 maintains separate queues 403 for each service instance. Thus, the total number of queues 403 is the quantity of separate queues 403 multiplied by the number of downlink regions that the ST 300 makes BoD requests to or has connections to. The best QOS is achieved if each connection and service instance has its own queue, providing no interference, in-order delivery, and individual traffic shaping. In view of the above considerations, according to one embodiment of the present invention, ST 300 uses a separate queue for each connection for Constant Rate service. Likewise, for the Constant Rate with Burst services, ST 300 utilizes a separate queue for each connection. Each of the 4 instances of Normal/High Priority Burst service uses a group of queues; one for each destination downlink region. The Low-volume Low-latency Burst service uses a single queue. The number of downlink regions supported by ST 300 is a sizing parameter based on ST type.

ST 300 also supports burst services for carrying internally sourced messages. These messages include bandwidth requests, address resolution requests, and all management messages to the NOCC 111. According to one embodiment of the present invention, ST supports the following internal queues: a BOD/HVUL (Bandwidth-on-demand/High Volume) request queue; a power control message queue; a calibration message queue; a signaling message queue; and a normal management message queue. It is recognized that other internal queues may be added, depending on the particular implementation of system 100.

FIG. 5 shows a diagram of exemplary queues whose depths are dynamically altered, according to an embodiment of the present invention. In this example, ST 300 utilizes an Internal ST BoD queue 501 for storing BoD request packets. An Internal Management queue 503 stores usage data, for example. A CR queue 505 supports a video teleconference from Port 1 of ST 300. A CRWB queue 507 stores packets carrying data related to a custom application (e.g., voice-over-IP). A LVLLB queue 509 is used to store, for example, TCP Sync packets and HTTP (Hypertext Transport Protocol) GET messages. ST 300 provides two Normal Burst queues 511 and 513 for user data. The depths of queues 507, 511, and 513 can be dynamically changed to enhance the efficient utilization of such queues, as described in FIG. 6.

In the example of FIG. 5, each of the queues 501-513, depending on the user service that it corresponds to, has a mapping to the PDS (i.e., rate and/or volume) and a service weight (i.e., priority). The PDS mapping is relevant to scheduling, which is detailed in FIG. 7. Column 515 in the diagram shows the number of packets in the queue; for instance, queue 501 is empty. Further, as indicated by the PDS Mapping column 517, Internal ST BoD queue 501 may employ excess slots of both volume and rate allocations, may preempt a volume/rate slot, and use a contention slot. The Internal ST Management queue 503 is shown to have 15 packets and a service weight of 10 (which is a unitless number), with a profile limit of 5. By way of example, queue 503 provides a BoD request for 5 packets. As for the Constant Rate queue 505, the PDS mapping is to a rate service; because rate services are given high priority by definition a rate is specified (e.g., 2 packets/frame). A Constant Rate with Burst queue 507 may use the rate service, as well as the volume service for any packets in excess of the rate. Queue 507 has a priority order of 2 and an associated rate of 2 packets/frame. The priority order specifies the relative prioritization among other high priority traffic. For instance, the LVLLB queue 509 has a priority order of 1; as a consequence, packets in this queue 509 are given preferential treatment over the packets in queue 507 during queue servicing. The Normal Burst queues 511 and 513 both use volume service and have equal service weights (e.g., 45). Queues 511 and 513 have profile limits of 106.

It should be noted that ST 300 use only a subset of the queues discussed above. Use of specific queues depends on the profiles of the particular ST 300. For example, a residential ST that is configured for Internet access service may only use Normal Burst queues 511 and 513 for transmitting data. It should further be noted that other queues can be defined as new user services are created.

Figure 6:
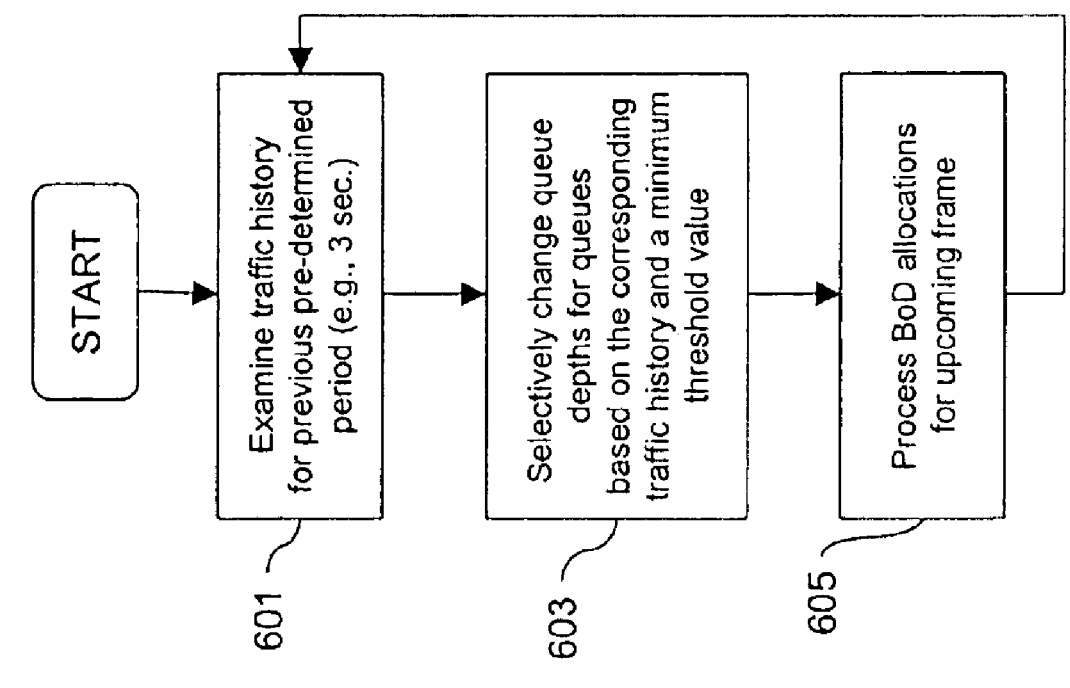
FIG. 6 is a flowchart of the queue depth management process, according to an embodiment of the present invention.

FIG. 6 shows a flowchart of the queue depth management process, according to an embodiment of the present invention. For N/HPB and CRWB queues, ST 300 supports a dynamic buffer management scheme. Queue control logic 402 (FIG. 4), as in step 601, examines the queue traffic statistics that was collected during some configurable period in the past; in an exemplary embodiment, this predetermined period is about 3 seconds. This queue management scheme allows any single burst queue to grow to the total size of all memory buffers (e.g., up to 3 seconds at the ST's full channel rate), assuming that that queue was using the entire channel rate. When many queues are sharing the channel rate, each queue is sized according to how much data it is successfully transferring. To prevent starving the more active queues, slow queues are not allowed to accumulate a large number of buffers.

Each queue has a minimum size so that it may ramp-up to a faster transfer rate (as in TCP slow-start). These minimum reserved buffers also reduce the total buffer space that can be assigned dynamically. The ST 300 sets the maximum queue depth equivalent to the number of internal system packets that were allocated to that queue during the previous predetermined period (step 603). The queue depth is set according to the following equation:

New Queue Depth=$F$*(sum of allocations for last $A$ frames)+$B$ (units in packets), where A is Allocations To Consider (Number of Uplink Transmission Frames: 10–50, default=30); B is the Minimum Queue Depth (for Packets: 10–100, default=32); and F is the Queue Depth Factor, which is a configurable parameter to adjust the impact of the past allocations.

Packets already on the queue beyond the new depth are not dropped. However, no additional packets can be added until the queue drops below this threshold. After processing the BoD allocations for the upcoming frame, the ST re-evaluates the sizes of all of the burst queues (per step 605).

For CRWB queues, ST 300 supports fixed, configurable maximum buffer sizes that limit the maximum burst size. Within this maximum queue depth, the ST 300 applies the dynamic buffer management scheme, as described above.

For optimal TCP throughput (without spoofing), the ST needs to buffer enough data to allow for the maximum growth of the TCP windows given the round-trip time and channel rate. For these requirements, the transport platform buffer memory needs have been rounded up to 3 seconds at the ST's full channel rate.

For Constant Rate queues, the ST supports a fixed, configurable buffer size that can accommodate and limit input jitter. The LVLL queue also has fixed, configurable buffer size corresponding to the maximum queue depth.

Turning back to the discussion of FIG. 4. When an ST queue supporting a user service reaches its maximum depth, the queue drop control logic 401 drops any additional packets (referred to as the tail-drop mechanism). This tail-drop mechanism is employed by ST 300 to respond to congestion or a user service that is exceeding its profile—causing buffer space to become exhausted. Queue drop control logic 401 continues to drop packets until some have been drawn off the front of the queue, making room for new packets. This is an effective congestion control mechanism in that dropping of an IP datagram causes TCP to slow down the data transmission rate.

User Port Adaptations may need to use other methods of determining which packets should be dropped before sending them to the Transport Platform queues 403. The ST Transport Platform 307 provides information on the current depth of all of its queues for use by the adaptations in support of additional queue control mechanisms. Also, an indication is provided when a queue is full, so that the User Port Adaptation can avoid packet dropping.

ST 300 drops the entire user data packet if accepting that packet would exceed the buffer space currently allocated for that queue. Individual system packets are not dropped, as dropping causes partial drop of a user packet.

ST 300 maps traffic from each User Data Transport Service instance to one or more Packet Delivery Services (PDS). The rate and volume Packet Delivery Services are implemented using a Bandwidth Control Protocol or a High Volume Uplink. These and the data contention and persistent Aloha PDS, are discussed in greater detail later.

The Low-Volume Low-Latency (LVLL) service is primarily served using data contention. Whenever possible, the LVLL queue will preempt volume PTOs from any other user service or use excess rate, volume, or Persistent Aloha PTOs from any user service. When a User Port Adaptation sends a packet to the LVLL service, if the packet is larger than one codeblock or the LVLL queue is full, the transport platform must re-map the packet to a different configured service queue group. Within that group, the transport platform uses the destination downlink to map to a specific queue.

A variety of mechanisms are used to perform traffic metering in the ST 300, depending upon the type of Packet Delivery Service. Many of the mechanisms use the basic construct of the token bucket to implement a traffic profile. Each traffic profile is characterized by a Packet Refill Rate (PRR in units of system packets), a Refill Time Period (RTP in units of system transmission frames), and a Maximum Burst Size (MBS in units of system packets). The traffic profile token bucket starts full at the level specified by the Maximum Burst Size. The ST 300 subtracts one from the token bucket for each system packet that the ST forwards under the profile. The ST 300 replenishes the token bucket at the Packet Refill Rate on the Refill Time Period boundaries up to the limit of the Maximum Burst Size. At any given time, if the token bucket has been decremented to zero, any additional system packets are not forwarded on the path protected by that profile. Such packets are "blocked" and continue to wait on queue.

No usage (no profile) can be configured by setting the Maximum Burst Size parameter to zero. Unlimited usage can be configured by setting the profile parameters to values permitting traffic greater than the channel rate.

Volume services (Normal/High-priority Burst and the volume portion of Constant Rate with Burst) are metered differently in HVUL and non-HVUL modes. In the normal volume (non-HVUL) mode, volume services are metered at the BOD Request step using one token bucket for the HPV traffic profile and another token bucket for the total HPV+ LPV traffic profile. Each profile controls all traffic for the PDS or combination of PDSs independent of the destination. A packet must pass both profile tests before the ST will include it in a high-priority volume BOD request. The two profiles provide a flexible mechanism that can be used to control the amount of traffic allowed for burst-based User Data Transport Services. It can be used to limit the uplink data rate of a terminal to less than the full channel rate, thereby supporting different grades of service for the same ST type.

In High Volume Uplink mode, volume services are metered separately for each HVUL destination downlink region during Queue Scheduling by scheduling no more packets for each transmission frame than the maximum set by the destination downlink algorithm. The limits are set per region by the HVUL congestion management mechanism described below.

Rate services (Constant Rate and the rate portion of Constant Rate with Burst) are handled differently by the ST than volume services; they are metered by shaping during Queue Scheduling. Token buckets are not used. At the time of connection setup (or equivalent), each rate-based service is assigned a Constant Packet Rate per uplink transmission frame, which has been approved for usage through the NOCC 111. Each rate queue is shaped to the CPR by drawing that number of packets (if present) off the queue for each transmission frame. These packets are not counted against the volume traffic profiles since they are a constant. So, for the Constant Rate with Burst Service, the constant rate portion is not counted against the volume traffic profiles, but any packets in the queue due to bursts above the constant rate are limited by the volume traffic profiles.

Data contention, preemption, and excess slot usage are metered using individual token buckets during Queue Servicing.

The ST 300 supports a number of queues for carrying internally sourced messages. These messages include bandwidth requests, address resolution requests, and all management messages to the NOCC 111. In order to support NOCC 111 server congestion management, each internal traffic queue that uses a volume PDS is metered by the ST application that sources the messages.

Use of Persistent Aloha (PA) is limited directly by the basic PA mechanism. If more than a small number of packets accumulate on the PA queue, then the queue is serviced using volume requests, which are metered as described above.

The ST 300 implements a prioritization mechanism which controls how different volume services (Normal/High-priority Burst and the volume portion of Constant Rate with Burst) are drawn against the traffic profiles for bandwidth requests and allocation sharing. This mechanism can be used to favor one volume service over another, or to ensure fair treatment between multiple instances of the same service.

Also, certain internally sourced messages need to be given priority treatment. Each instance of Normal/High-priority Burst and Constant Rate with Burst service is configured with a Service Weight. The ST 300 determines how it apportions packets for each volume traffic profile using the Service Weight of all of the queues drawing on that traffic profile. The ST first serves the internal queues in a fixed priority order. Next the ST 300 serves all of the N/HPB and CRWB queues in a ratio determined by their relative Service Weights until the profile is exhausted. The service order is as follows: (1) serve the internal queues in this order until their individual traffic profiles are exhausted: a) signaling message queue, and b) normal management message queue; (2) serve these user service queues by their relative Service Weights until the HPV profile or the HPV+LPV profile is exhausted: a) CRWB queues configured to use high-priority volume, and b) High Priority Burst queues; and (3) serve these user service queues by their relative Service Weights until the HPV+LPV profile is exhausted: a) Constant Rate with Burst queues configured to use low-priority volume, and b) Normal Priority Burst queues.

Figure 7:
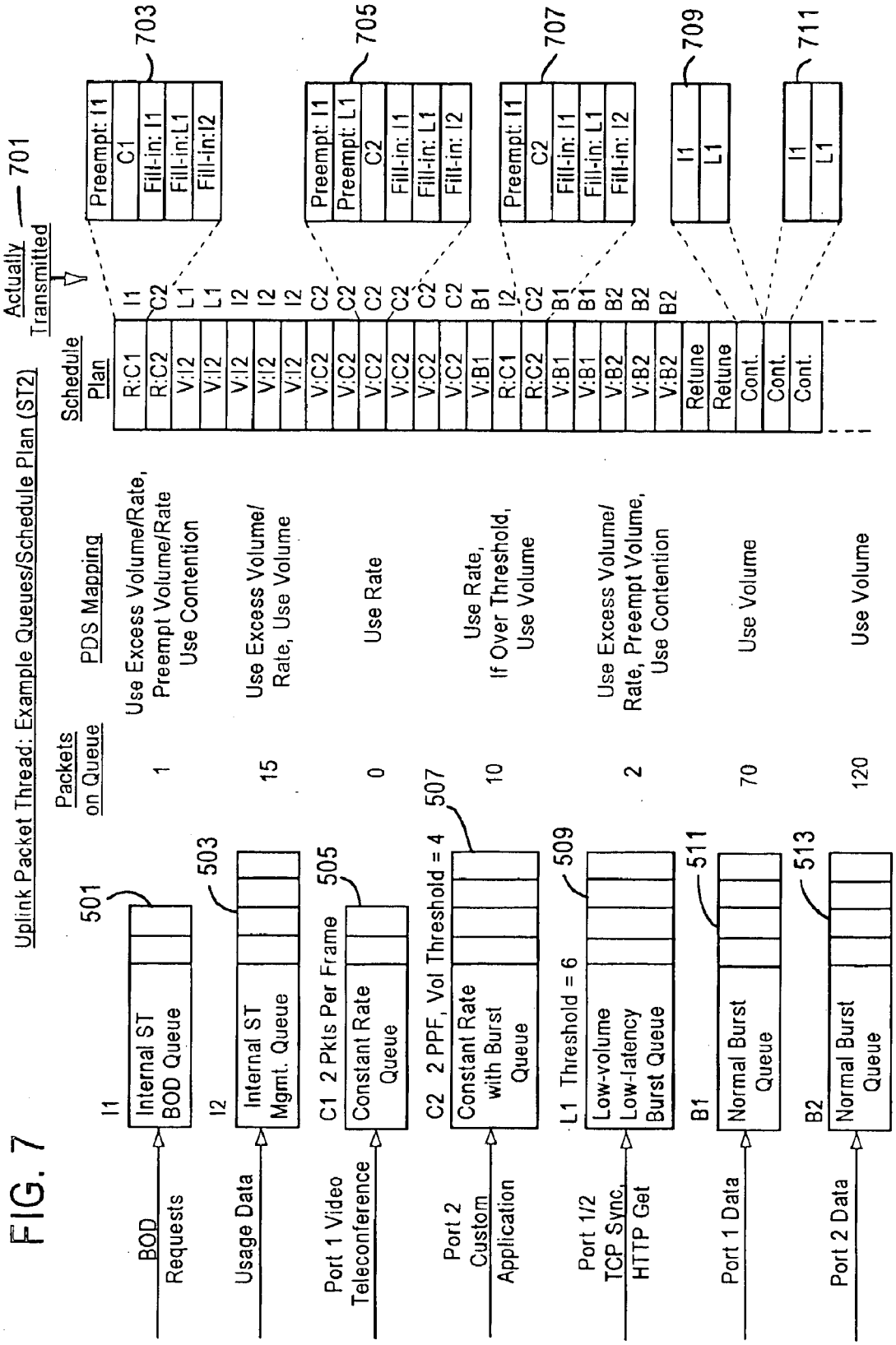
FIG. 7 is a diagram of a schedule plan for transmission of packets from the ST, according to an embodiment of the present invention.

FIG. 7 shows a diagram of a schedule plan for transmission of packets from the ST, according to an embodiment of the present invention. ST 300 performs uplink service scheduling at the time that it processes the received bandwidth allocation messages (or the equivalent for a High Volume Uplink channel) for an upcoming transmission frame. The allocation messages are all received a short time before the transmission frame time to which they apply. Beginning, for example, 23 milliseconds before the next frame starts, the ST 300 examines all of its allocations and produces an optimal schedule plan for mapping service packets to the available transmission slots. The schedule plan also determines if any slots are available for contention transmissions. The ST 300 cannot use allocation messages that are received too late. If this occurs, the ST 300 sends an alarm since system bandwidth is being wasted. If the ST receives no allocation messages, then it can still plan for contention transmissions.

The ST 300 prepares the schedule plan for rate-based services with the goal of minimizing the jitter experienced by each of the traffic flows. The ST 300 loops through all of the slots that are allocated for rate packet delivery in the upcoming frame. Since the rate connections are admitted by the NOCC 111, the proper number of rate allocations should be available unless there is a fallback mode transition occurring.

The allocated rate slots are already distributed throughout the frame to minimize jitter. As the ST 300 examines each packet transmission opportunity allocated in the frame, the ST 300 selects one of the queues serving Constant Rate or Constant Rate with Burst Service. The ST 300 assigns one packet transmission opportunity to a queue, and then moves on to another queue. For each queue, the ST assigns a maximum of 2 to 2048 packets per frame, in increments of 2 packets, which corresponds to the Constant System Packet Rate for a Constant Rate Service or the rate portion of a Constant Rate with Burst Service. By scheduling the packet transmission opportunities algorithmically, the ST 300 ensures that packets from each queue appear in a repeating pattern from frame to frame with minimal jitter. This shapes the user traffic to the Constant System Packet Rate. The ST 300 schedules rate traffic this way for both HVUL and normal volume (non-HVUL) modes.

It should be noted that for a High Volume Uplink channel, the ST 300 may spread both the rate and volume opportunities more evenly than the current Bandwidth Request algorithm, since the ST 300 does not have to be limited by slot allocations. This would improve the jitter and the impact of HVUL bursts on the system. This can be accomplished by first scheduling the packet transmission opportunities in numerical order and then applying a random mapping to re-sort all the PTOs. The same mapping may be used for each frame.

In the normal volume (non-HVUL) mode, the ST prepares the schedule plan for volume-based services with the goal of weighting the volume bandwidth allocations among the queues that have outstanding volume requests. For each queue, the ST 300 keeps track of the number of packets that were used to make High Priority or Low Priority Volume bandwidth requests. The ST 300 loops through all of the slots allocated for volume packet delivery in the upcoming frame. Each volume allocation is made for a specific set of destinations. The ST 300 shares that allocation among the queues that made requests to those destinations. The allocation is shared among the queues using the service order and weighting mechanism described above.

For slots allocated for High Priority Volume, the ST 300 serves the internal queues in order (up to the amount requested) until the allocation is exhausted. Next, the ST 300 serves these user service queues by their relative Service Weights (up to the amount requested) until the allocation is exhausted: (1) Constant Rate with Burst queues configured to use high-priority volume, and (2) High Priority Burst queues.

For slots allocated for Low Priority Volume, the ST 300 serves these user service queues by their relative Service Weights (up to the amount requested) until the allocation is exhausted: (1) Constant Rate with Burst queues configured to use low-priority volume, and (2) Normal Priority Burst queues.

In High Volume Uplink mode, the ST 300 prepares the schedule plan for volume-based services with the goal of weighting the volume bandwidth allocations among the volume services while metering separately for each HVUL destination downlink region. The ST 300 schedules no more packets for each transmission frame than the maximum set by the destination downlink algorithm. The HVUL ST is allocated a specified number of slots in every uplink frame. The allocation is shared among the queues using the service order and weighting mechanism. The queues are served in this order: (1) the internal queues in order (up to the downlink limits) until the allocation is exhausted; and (2) user service queues by their relative Service Weights (up to the downlink limits) until the allocation is exhausted: a) Constant Rate with Burst queues configured to use high-priority volume, and b) High Priority Burst queues.

For slots allocated for Low Priority Volume, ST 300 serve these user service queues by their relative Service Weights (up to the downlink limits) until the allocation is exhausted: (1) Constant Rate with Burst queues configured to use low-priority volume, and (2) Normal Priority Burst queues.

In the normal volume (non-HVUL) mode, the ST 300 plans for contention transmission whenever possible. Contention is not used in the High Volume Uplink mode. There must be at least three unused contiguous slots available to schedule contention. This allows for tuning to and from the contention channel, since each retuning requires one slot time. After scheduling for rate and volume, the ST 300 scans the schedule plan for open areas of at least three slots. In each of these, it schedules for possible contention transmission. Each frame, the ST 300 picks a contention channel to use and will "park" on that channel just in case a packet allowed to use contention comes along.

The ST 300 also schedules the usage of preemption and excess slots for the services allowed to use these features. Preemption and excess slots can be used for any types of rate, volume, or contention packet transmission opportunities. For each packet transmission opportunity (PTO) in the schedule plan, the ST 300 specifies a list of queues: (1) queues that can preempt this allocation (primarily BOD and Low-volume-Low Latency packets); (2) the main queue for this allocation; and (3) queues that use excess slots (primarily ST management and Low-volume-Low Latency packets). It should be noted that the relationships of which queues are allowed to preempt others and which queues are allowed to use the excess slots are known when the user services are configured. Thus, for each PTO, the schedule plan can point to a list of queues that define the relationships for that main queue.

When building the schedule plan, the ST 300 consults the Uplink Power Control thread (ULPC) for the proper power settings. The ULPC thread uses the frame number and channel number to look up and interpolate the correct power setting for each transmission. The packet thread will invoke this ULPC algorithm each time it schedules a different channel in the plan for the upcoming frame. There may be three different channels that are used in any one frame: the allocated rate/volume channel, the data contention channel and the persistent Aloha channel. The channel and power settings are added to the schedule plan for each slot; they are put into effect at the actual beginning of each slot time.

The ST 300 performs uplink packet servicing at a time as close as possible to each upcoming packet transmission opportunity. Using the schedule plan and the packet servicing behaviors, the ST 300 draws a packet from the appropriate queue and forwards the packet to the remaining uplink functions.

ST 300 performs the basic servicing of the Rate-based queues as follows. When the packet servicing function processes a Rate packet transmission opportunity in the schedule plan that is assigned to a specific queue, the ST 300 takes a system packet's worth of data off of the specified queue and forwards it to the next uplink function. A packet will be available on that queue unless the traffic has exceeded its expected jitter or the traffic flow is pausing or terminating. If no packet is available on the queue, this packet transmit opportunity may be used for other services as described below. It should be noted that traffic from other Constant Rate services will not use this opportunity, since the Rate traffic is strictly scheduled to support shaping and jitter reduction.

For the basic servicing of Volume-based queues, ST 300 follows a similar process. When the packet servicing function processes a Volume packet transmission opportunity in the schedule plan that is assigned to a specific queue, the ST takes a system packet's worth of data off of the specified queue and forwards it to the next uplink function. A packet will be available on that queue which corresponds to a Volume request unless one of the preemption mechanisms (such as internal traffic taking unused Rate packet transmission opportunities) has removed it early.

ST 300 serves an internally sourced packet (if any are ready) for each unused Rate packet transmission opportunity. Internally sourced messages include bandwidth requests, address resolution requests, and all management messages to the NOCC 111.

As shown, at time of servicing, Internal ST BoD queue 501 has one packet to transmit. The Internal ST Management queue 503 has 15 packets. The Constant Rate queue 505 has no packets, while the CRWB queue 507 has 10 packets stored. The LVLLB queue 509 stores 2 packets. Normal Burst queues 511 and 513 stores 70 and 120 packets, respectively. Based in part on the previous allocations to these queues 501–513, the BoD control logic 405 generates a schedule plan 701 that assigns packet transmission opportunities (PTOs), or slots, to the queues 501–513.

In the first PTO, the schedule plan 701 specifies that the packets of Constant Rate queue 505 may transmit if the queue 505 has packets to send. However, the schedule plan 701 may be preempted according to a hierarchical list 703 of queues. This list 703 is created by the queue servicing logic 407 and prioritizes the queues. List 703 indicates that if queue 501 has packets to send it may do so, otherwise the PTO is given to the intended queue 505. In this case, because Internal ST BoD queue 501 has packet I1, packet I1 will occupy the slot during actual transmission. However, in the event that queue 505 does not have packets, list 703 specifies the queues that may fill-in the slot. For example, the fill-in queues may be queues 501 (again if a packet arrives), 509, and 503.

For the $10^{th}$ PTO, list 705 specifies that queues 501 and 509 may preempt queue 507. Queues 501, 509, and 503 (in this order) may fill-in. In PTO 16, list 707 permits queue 501 to preempt, while queues 501, 509, and 503 may fill-in. PTOs 24 and 25 have corresponding lists 709 and 711 that permit queues 501 and 509 to transmit, whereby queue 501 is given the higher priority.

The above approach ensures that the prioritization of user services as well as internal control messaging is effectively processed.

Figure 8A:
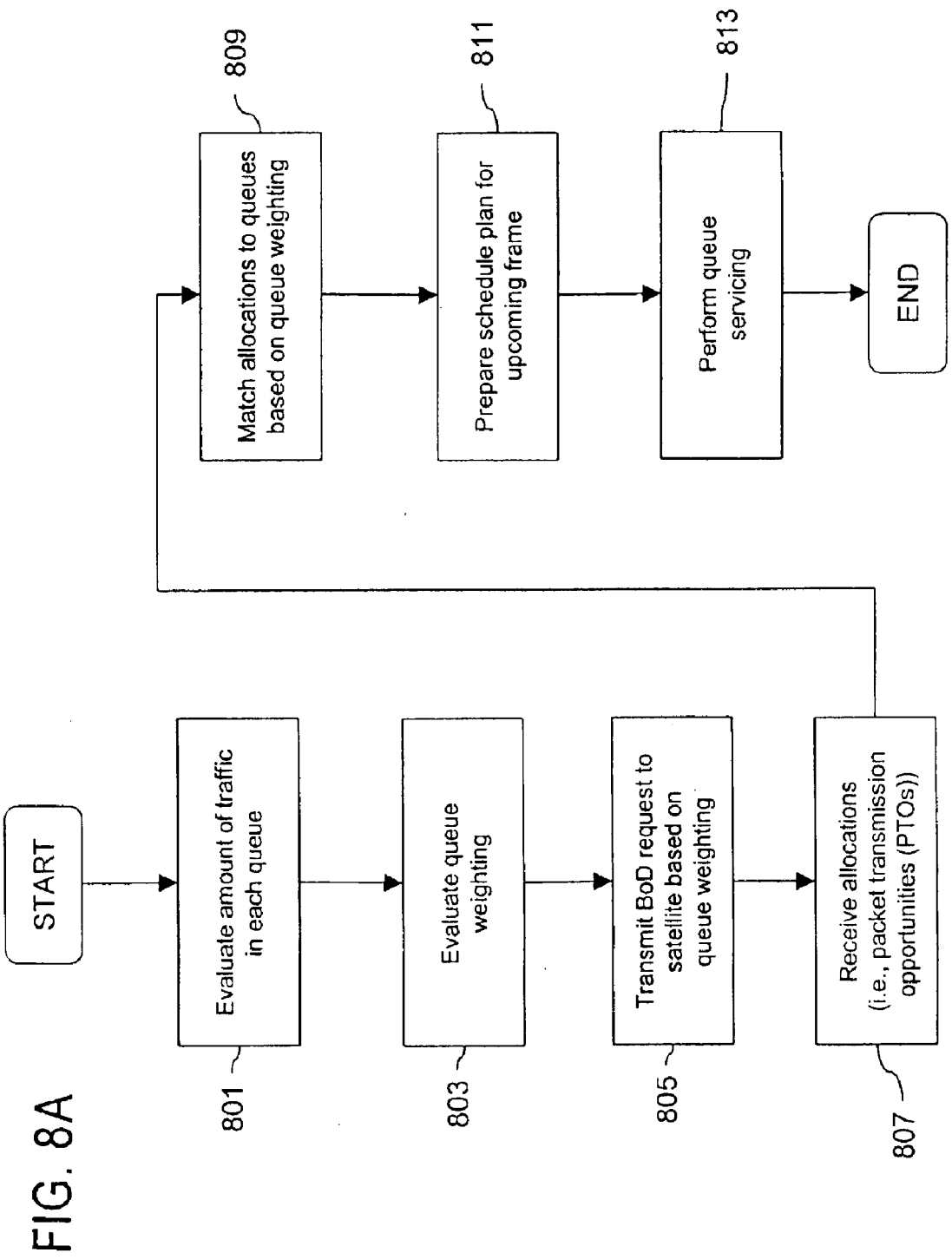
FIGS. 8A and 8B are flowcharts of the scheduling and servicing processes, respectively, according to an embodiment of the present invention.
Figure 8B:
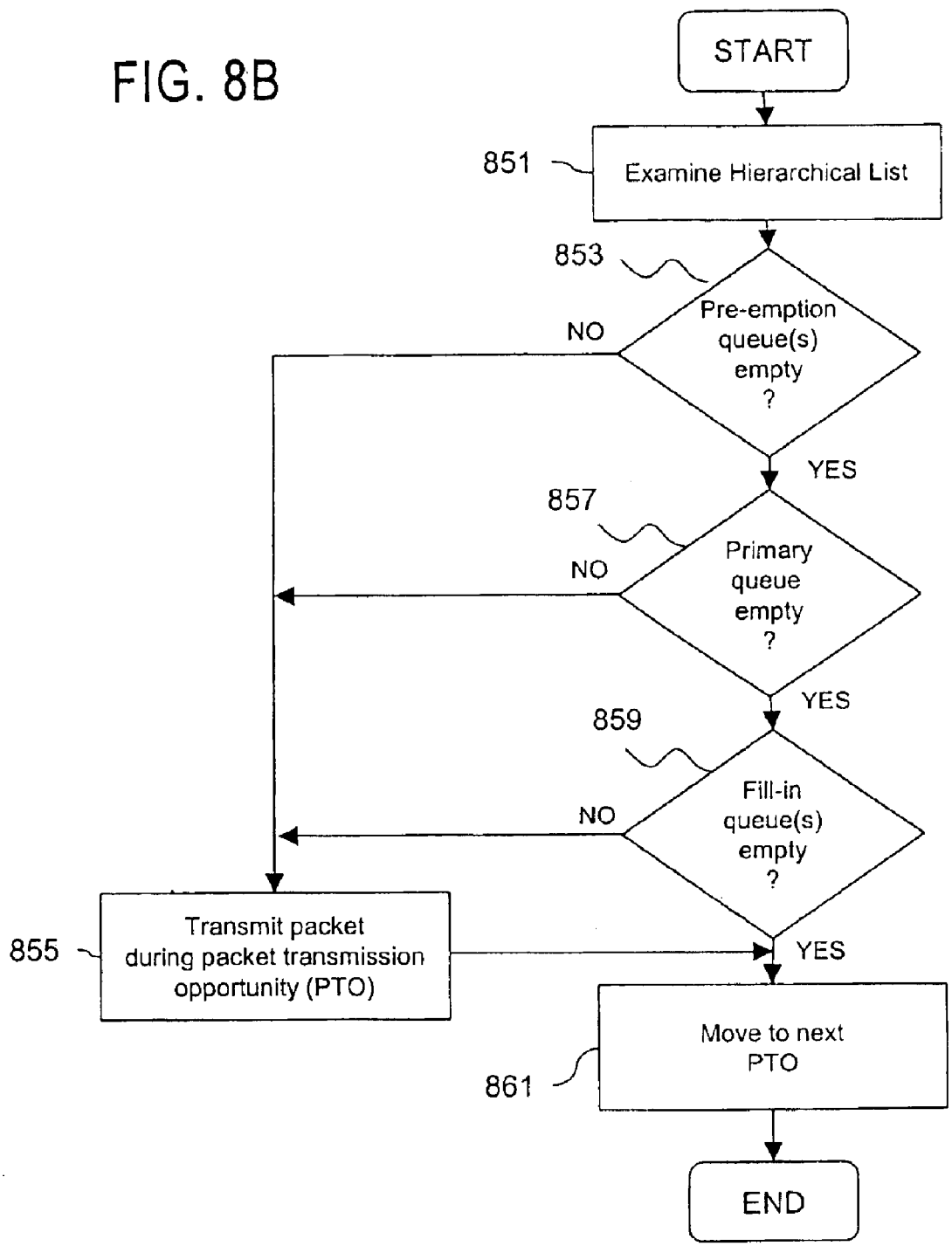

FIGS. 8A and 8B show flowcharts of the scheduling and servicing processes, respectively, according to an embodiment of the present invention. To produce the schedule plan (like that shown in FIG. 7), ST 300 evaluates the amount of traffic in each queue 403, per step 801. Next, in step 803, the ST 300 examines the weighting of the queues 403, thereby determining priority. Based upon the queue weighting and stored traffic, ST 300 transmits a BoD request to the satellite 101 (step 805). Thereafter, ST 300 receives the allocations—i.e., packet transmission opportunities (PTOs). These PTOs are matched up with the appropriate queues according to the service weights, per step 809. In step 811, a schedule plan is prepared by the ST 300 for the upcoming frame. The capability to produce the schedule plan advantageously provides a mechanism to guarantee quality of service levels. By contrast, conventional switching and/or routing systems cannot predetermine a transmission plan, as the packets are treated largely on a individual basis. Next, the ST 300 performs, as in step 813, queue servicing according to the prepared schedule plan.

FIG. 8B shows the process of performing queue servicing, according to an embodiment of the present invention. Queue servicing is executed as close as possible to each packet transmission opportunity (PTO), cycling down the list of queues in the schedule plan (as described in FIG. 7). ST 300 first takes packets from the queue(s) that is designated as having preemption rights (i.e., "preemption queue"), and then packets from the primary queue, which is the queue that the schedule plan specifies. If the main queue does not have packets, then the designated fill-in queues are serviced. First, the ST 300 examines the list for the particular PTO, per step 851, checking whether the preemption queue(s) has data to be transmitted (step 853). As in the example of FIG. 7, the Internal ST BoD queue 501 is designated as the preemption queue. That is, BoD request packets I1 is allowed to occupy the slot assigned to the constant rate data, C2, from queue 507. In this instance, because the preemption queue contains I1, the ST 300 transmits the packet in this PTO (or slot), per step 855. However, if the preemption queue (e.g., queue 501) were empty, the primary queue (e.g., queue 507) is checked to determine whether a packet is stored therein (step 857). Assuming the primary queue is empty, the designated fill-in queues are checked, as in step 859, in the order enumerated in the list. In this example, the fill-in queue is reserved for high priority services, such as the LVLLB services; i.e., queue 509. Next, the ST 300 examines the next available PTO, repeating the previous steps until all the PTOs are satisfied. According to an embodiment of the present invention, the PTOs correspond to the available time slots of the TDM frame.

Figure 9:
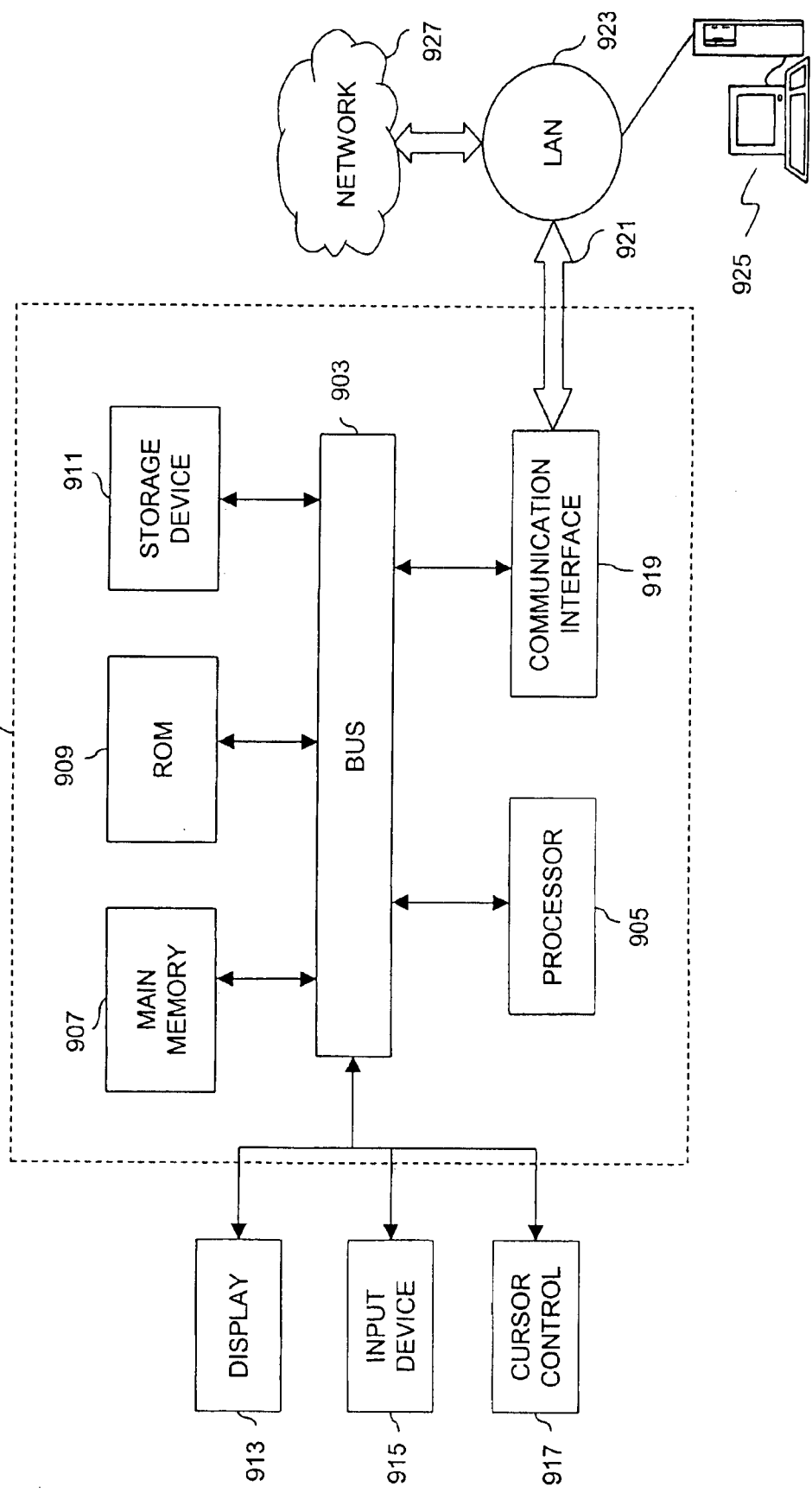
FIG. 9 is a diagram of a computer system that can perform the capacity allocations, in accordance with an embodiment of the present invention.

FIG. 9 illustrates a computer system 901 upon which an embodiment according to the present invention may be implemented to perform the queue management, scheduling, and queue servicing functions. Computer system 901 includes a bus 903 or other communication mechanism for communicating information, and a processor 905 coupled with bus 903 for processing the information. Computer system 901 also includes a main memory 907, such as a random access memory (RAM) or other dynamic storage device, coupled to bus 903 for storing information and instructions to be executed by processor 905. In addition, main memory 907 may be used for storing temporary variables or other intermediate information during execution of instructions to be executed by processor 905. Computer system 901 further includes a read only memory (ROM) 909 or other static storage device coupled to bus 903 for storing static information and instructions for processor 905. A storage device 911, such as a magnetic disk, flash memory, or optical disk, is provided and coupled to bus 903 for storing information and instructions.

Computer system 901 may be coupled via bus 903 to a display 913, such as a cathode ray tube (CRT), for displaying information to a computer user. An input device 915, including alphanumeric and other keys, is coupled to bus 903 for communicating information and command selections to processor 905. Another type of user input device is cursor control 917, such as a mouse, a trackball, or cursor direction keys for communicating direction information and command selections to processor 905 and for controlling cursor movement on display 913.

According to one embodiment, the steps of FIGS. 6, 8A, and 8B are provided by computer system 901 in response to processor 905 executing one or more sequences of one or more instructions contained in main memory 907. Such instructions may be read into main memory 907 from another computer-readable medium, such as storage device 911. Execution of the sequences of instructions contained in main memory 907 causes processor 905 to perform the process steps described herein. One or more processors in a multi-processing arrangement may also be employed to execute the sequences of instructions contained in main memory 907. In alternative embodiments, hard-wired circuitry may be used in place of or in combination with software instructions. Thus, embodiments are not limited to any specific combination of hardware circuitry and software.

Further, the queue management, scheduling, and queue servicing processes of the present invention may reside on a computer-readable medium. The term "computer-readable medium" as used herein refers to any medium that participates in providing instructions to processor 905 for execution. Such a medium may take many forms, including but not limited to, non-volatile media, volatile media, and transmission media. Non-volatile media includes, for example, optical or magnetic disks, such as storage device 911.

Volatile media includes dynamic memory, such as main memory 907. Transmission media includes coaxial cables, copper wire and fiber optics, including the wires that comprise bus 903. Transmission media can also take the form of acoustic or light waves, such as those generated during radio wave and infrared data communication.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 905 for execution. For example, the instructions may initially be carried on a magnetic disk of a remote computer. The remote computer can load the instructions relating to the queue managment to control call processing remotely into its dynamic memory and send the instructions over a telephone line using a modem. A modem local to computer system 901 can receive the data on the telephone line and use an infrared transmitter to convert the data to an infrared signal. An infrared detector coupled to bus 903 can receive the data carried in the infrared signal and place the data on bus 903. Bus 903 carries the data to main memory 907, from which processor 905 retrieves and executes the instructions. The instructions received by main memory 907 may optionally be stored on storage device 911 either before or after execution by processor 905.

Computer system 901 also includes a communication interface 919 coupled to bus 903. Communication interface 919 provides a two-way data communication coupling to a network link 921 that is connected to a local network 923. For example, communication interface 919 may be a network interface card to attach to any packet switched local area network (LAN); e.g., a Universal Serial Bus (USB). As another example, communication interface 919 may be an asymmetrical digital subscriber line (ADSL) card, an integrated services digital network (ISDN) card or a modem to provide a data communication connection to a corresponding type of telephone line. Wireless links may also be implemented. In any such implementation, communication interface 919 sends and receives electrical, electromagnetic or optical signals that carry digital data streams representing various types of information.

Network link 921 typically provides data communication through one or more networks to other data devices. For example, network link 921 may provide a connection through local network 923 to a host computer 925 or to data equipment operated by a service provider, which provides data communication services through a communication network 927 (e.g., the Internet). LAN 923 and network 927 both use electrical, electromagnetic or optical signals that carry digital data streams. The signals through the various networks and the signals on network link 921 and through communication interface 919, which carry the digital data to and from computer system 901, are exemplary forms of carrier waves transporting the information. Computer system 901 can transmit notifications and receive data, including program code, through the network(s), network link 921 and communication interface 919.

The techniques described herein provide several advantages over prior approaches to managing a plurality of queues of a satellite terminal operating in satellite communications system. The satellite terminal includes a queue control logic that is configured to dynamically change depths of the queues, according to a prescribed scheme. The prescribed scheme specifies new depths of the plurality of queues based upon past bandwidth allocations associated with the respective queues. This arrangement advantageously provides efficient management of queues to ensure proper treatment of quality of service classes.

Obviously, numerous modifications and variations of the present invention are possible in light of the above teachings. It is therefore to be understood that within the scope of the appended claims, the invention may be practiced otherwise than as specifically described herein.

What is claimed is:

1. A method of managing a plurality of queues of a terminal operating in satellite communications system, the method comprising:

storing packets in the plurality of queues; and dynamically changing a depth of one of the plurality of queues according to a prescribed scheme, the prescribed scheme specifying a new depth of the one queue based upon past bandwidth allocations associated with the one queue.

2. The method according to claim 1, further comprising:

examining traffic statistics associated with the one queue for a pre-determined period.

3. The method according to claim 1, wherein the one queue in the changing step uses an entire channel rate, the prescribed scheme permitting the new depth to equal a total memory size.

4. The method according to claim 1, wherein the plurality of queues in the storing step is sharing a channel rate, the prescribed scheme specifying the new depth based upon successful transfer of packets stored within the one queue.

5. The method according to claim 1, wherein the changing step comprises:

designating a minimum queue depth for each of the plurality of queues.

6. The method according to claim 1, further comprising:

dropping subsequent packets entering the one queue if the new depth of the queue is exceeded.

7. The method according to claim 1, wherein the plurality of queues in the storing step is weighted according to user services.

8. The method according to claim 1, wherein the plurality of queues in the storing step corresponds to user services that include constant rate service and burst service.

9. The method according to claim 1, wherein the plurality of queues in the storing step is logical queues.

10. A terminal apparatus for transmitting packets to a satellite communications system, comprising:

a plurality of queues configured to store the packets; and a queue control logic configured to dynamically change depths of the plurality of queues according to a prescribed scheme, wherein the prescribed scheme specifies new depths of the plurality of queues based upon past bandwidth allocations associated with the respective plurality of queues.

11. The apparatus according to claim 10, wherein the queue control logic is configured to examine traffic statistics associated with the respective plurality of queues for a pre-determined period.

12. The apparatus according to claim 10, wherein one of the plurality of queues uses an entire channel rate, the prescribed scheme permitting the new depth of the one queue to equal a total memory size.

13. The apparatus according to claim 10, wherein the plurality of queues are sharing a channel rate, the prescribed scheme specifying the new depths based upon successful transfer of packets stored within the plurality of queues.

14. The apparatus according to claim 10, wherein the queue control logic designates a minimum queue depth for each of the plurality of queues.

15. The apparatus according to claim 10, further comprising:
a queue drop control logic coupled to the plurality of queues and configured to drop subsequent packets entering the plurality of queues if the respective new depths of the plurality of queues are exceeded.

16. The apparatus according to claim 10, wherein the plurality of queues are weighted according to user services.

17. The apparatus according to claim 10, wherein the plurality of queues corresponds to user services that include constant rate service and burst service.

18. The apparatus according to claim 10, wherein the plurality of queues is logical queues.

19. The apparatus according to claim 10, further comprising:
a bandwidth-on-demand control logic configured to forward bandwidth-on-demand request packets to the plurality of queues.

20. The apparatus according to claim 10, further comprising:
a queue servicing logic configured to forward the packets stored in the plurality of queues to an uplink channel of the satellite communications system.

21. A satellite communications system comprising:
a hub configured to control bandwidth allocations in conjunction with a satellite; and
a plurality of terminals configured to issue bandwidth allocation requests to the satellite, each of the terminals comprising,
a plurality of queues configured to store the packets, and
a queue control logic configured to dynamically change depths of the plurality of queues according to a prescribed scheme, wherein the prescribed scheme specifies new depths of the plurality of queues based upon past bandwidth allocations associated with the respective plurality of queues.

22. The system according to claim 21, wherein the queue control logic is configured to examine traffic statistics associated with the respective plurality of queues for a pre-determined period.

23. The system according to claim 21, wherein one of the plurality of queues uses an entire channel rate, the prescribed scheme permitting the new depth of the one queue to equal a total memory size.

24. The system according to claim 21, wherein the plurality of queues is sharing a channel rate, the prescribed scheme specifying the new depths based upon successful transfer of packets stored within the plurality of queues.

25. The system according to claim 21, wherein the queue control logic designates a minimum queue depth for each of the plurality of queues.

26. The system according to claim 21, wherein each of the plurality of terminals further comprises:
a queue drop control logic coupled to the plurality of queues and configured to drop subsequent packets entering the plurality of queues if the respective new depths of the plurality of queues are exceeded.

27. The system according to claim 21, wherein the plurality of queues are weighted according to user services.

28. The system according to claim 21, wherein the plurality of queues corresponds to user services that include constant rate service and burst service.

29. The system according to claim 21, wherein the plurality of queues is logical queues.

30. The system according to claim 21, wherein each of the plurality of terminals further comprises:
a bandwidth-on-demand control logic configured to forward bandwidth-on-demand request packets to the plurality of queues.

31. The system according to claim 21, wherein each of the plurality of terminals further comprises:
a queue servicing logic configured to forward the packets stored in the plurality of queues to an uplink channel of the satellite communications system.

32. A terminal apparatus for transmitting packets to a satellite communications system, comprising:
means for storing packets in the plurality of queues; and
means for dynamically changing a depth of one of the plurality of queues according to a prescribed scheme, the prescribed scheme specifying a new depth of the one queue based upon past bandwidth allocations associated with the one queue.

33. The apparatus according to claim 32, further comprising:
means for examining traffic statistics associated with the one queue for a predetermined period.

34. The apparatus according to claim 32, wherein the one queue uses an entire channel rate, the prescribed scheme permitting the new depth to equal a total memory size.

35. The apparatus according to claim 32, wherein the plurality of queues are sharing a channel rate, the prescribed scheme specifying the new depth based upon successful transfer of packets stored within the one queue.

36. The apparatus according to claim 32, wherein the changing means designates a minimum queue depth for each of the plurality of queues.

37. The apparatus according to claim 32, further comprising:
means for dropping subsequent packets entering the one queue if the new depth of the queue is exceeded.

38. The apparatus according to claim 32, wherein the plurality of queues are weighted according to user services.

39. The apparatus according to claim 32, wherein the plurality of queues correspond to the user services that include constant rate service and burst service.

40. The apparatus according to claim 32, wherein the plurality of queues in the storing step is logical queues.

41. A computer-readable medium carrying one or more sequences of one or more instructions for managing a plurality of queues of a terminal operating in satellite communications system, the one or more sequences of one or more instructions including instructions which, when executed by one or more processors, cause the one or more processors to perform the steps of:
storing packets in the plurality of queues; and
dynamically changing a depth of one of the plurality of queues according to a prescribed scheme, the prescribed scheme specifying a new depth of the one queue based upon past bandwidth allocations associated with the one queue.

42. The computer-readable medium according to claim 41, wherein the one or more processors further perform the step of:
examining traffic statistics associated with the one queue for a pre-determined period.

43. The computer-readable medium according to claim 41, wherein the one queue in the changing step uses an entire channel rate, the prescribed scheme permitting the new depth to equal a total memory size.

44. The computer-readable medium according to claim 41, wherein the plurality of queues in the storing step is sharing a channel rate, the prescribed scheme specifying the new depth based upon successful transfer of packets stored within the one queue.

45. The computer-readable medium according to claim 41, wherein the changing step comprises:

designating a minimum queue depth for each of the plurality of queues.

46. The computer-readable medium according to claim 41, wherein the one or more processors further perform the step of:

dropping subsequent packets entering the one queue if the new depth of the queue is exceeded.

47. The computer-readable medium according to claim 41, wherein the plurality of queues are weighted according to user services.

48. The computer-readable medium according to claim 41, wherein the plurality of queues in the storing step corresponds to user services that include constant rate service and burst service.

49. The computer-readable medium according to claim 41, wherein the plurality of queues in the storing step is logical queues.

* * * * *